(12) United States Patent
DiCamillo et al.

(10) Patent No.: US 7,280,523 B2
(45) Date of Patent: Oct. 9, 2007

(54) SIGNAL PROCESSING APPARATUS AND METHOD, AND COMMUNICATION SYSTEM UTILIZING SAME

(75) Inventors: Nicholas F. DiCamillo, Torrance, CA (US); Terrence R. Smigla, Pacific Palisades, CA (US); Garrick J. Harmon, Long Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 776 days.

(21) Appl. No.: 10/682,610

(22) Filed: Oct. 9, 2003

(65) Prior Publication Data

US 2005/0078622 A1   Apr. 14, 2005

(51) Int. Cl.
*H04J 1/00* (2006.01)
*H04B 7/185* (2006.01)

(52) U.S. Cl. .................. 370/343; 370/316; 455/11.1
(58) Field of Classification Search ............... 455/11.1, 455/12.1, 63.1, 67.13, 114.2, 307, 339, 427, 455/67.1; 370/343, 480, 481, 492, 497, 316
See application file for complete search history.

(56) References Cited

U.S. PATENT DOCUMENTS

| | | | | |
|---|---|---|---|---|
| 4,002,980 A | * | 1/1977 | Herz | 370/497 |
| 5,214,787 A | * | 5/1993 | Karkota, Jr. | 370/480 |
| 5,822,312 A | * | 10/1998 | Peach et al. | 370/492 |
| 6,173,155 B1 | * | 1/2001 | Norin | 455/12.1 |
| 6,275,479 B1 | | 8/2001 | Snell et al. | |
| 6,496,682 B2 | | 12/2002 | Butte et al. | |

FOREIGN PATENT DOCUMENTS

EP     0910179     4/1999

* cited by examiner

*Primary Examiner*—Quochien B. Vuong
(74) *Attorney, Agent, or Firm*—Carmen B. Patti & Assoc., LLC

(57) ABSTRACT

A communication system, a method of and an apparatus for communicating messages. N messages are transmitted from an originating station to a relaying station in a signal with frequencies within a bandwidth B, with each of the N messages having frequencies within a unique frequency band. Messages with adjacent frequency bands have the same or different bandwidths. At the relaying station, the messages are separated into groups of messages having the same bandwidth, where all messages in any group occupy non-adjacent frequency bands, and the messages of each group are then combined. Each combined group of messages is applied to a separate amplifier. Two or more messages of the same bandwidth may share a common traveling wave tube amplifier. Each amplified group of messages is then separated into separate messages which are transmitted to respective receiving stations.

15 Claims, 2 Drawing Sheets

SIGNAL PROCESSING APPARATUS AND METHOD, AND COMMUNICATION SYSTEM UTILIZING SAME

FIELD OF THE INVENTION

The present invention pertains to a method of and an apparatus for processing signals and to a communication system for communicating such signals. More particularly, the present invention pertains to a method of and an apparatus for communicating a signal containing a plurality of messages in a communication system including an originating station, a relaying station, and a plurality of receiving stations.

BACKGROUND OF THE INVENTION

Many communication systems are called upon to communicate a large number of messages from an originating station, through a relaying station, to a large number of receiving stations. By way of example, in a wireless communication system, such as a cellular telephone system, a signal containing a large number of messages might be uplinked from a cellular telephone provider to an earth orbiting satellite from which the messages are relayed to respective ground based receiving stations. It is desirable to minimize the equipment required on the relaying station, particularly when it is a satellite. Not only does minimizing the equipment reduce the cost of the satellite itself, but also it reduces the size of the satellite, and so reduces the cost involved in launching the satellite and placing it in the proper earth orbit.

In a hub and spoke multiple spot-beam communication satellite system, a set of N gateways or hubs provides bandwidth to several user ground cells or spokes in a forward direction. In a return direction, a set of user ground cells communicates back to the corresponding gateways. In the forward direction, a signal in a continuous frequency band of bandwidth B may be uplinked from the gateway to the satellite. The satellite demultiplexes the bandwidth into N segments of various bandwidths such that the N frequency bands occupy the full bandwidth B. The satellite then further processes each of the N bands by filtering, amplifying, and downlinking each band to an appropriate user ground cell. Each user ground cell receives a respective one of the N frequency bands.

The satellite filters each band to reduce adjacent channel interference and applies each band to a respective amplifier, for example a traveling wave tube amplifier. As the number of gateways increases so as to increase network capacity, the satellite requires a larger number of traveling wave tubes, resulting in a significant increase in the satellite size and weight, as well as in power consumption. Because satellites have size and power limits, increasing the number of gateways that can be accommodated requires decreasing the size and power requirements of the equipment needed for each gateway.

SUMMARY OF THE INVENTION

The present invention is a communication system and a method of and an apparatus for communicating a plurality of messages from an originating station, such as a gateway, through a relaying station such as a satellite, to a plurality of receiving stations, such as user ground cells. The messages are in frequency bands which are allocated across the overall communication bandwidth B such that a reduced number of traveling wave tubes are required, while also simplifying the filtering and minimizing the channel passband gain and phase distortion.

In accordance with the present invention, a plurality of N messages is transmitted from an originating station, such as a ground station, to a relaying station, such as a satellite, in a signal with frequencies within a frequency band having a bandwidth B, with each of the N messages having frequencies within a unique frequency band. Messages with adjacent frequency bands may have different bandwidths. The plurality of frequency bands occupy the bandwidth B. At the relaying station, the messages are separated into groups of messages having the same bandwidth, and the messages of each group are combined. Each combined group of messages is applied to a separate traveling wave tube amplifier to amplify the combined group of messages. Thus, two or more downlink beams of the same bandwidth may share a common traveling wave tube amplifier. Each amplified group of messages is then separated into separate messages, and the separated messages are transmitted to respective receiving stations, such as ground stations.

The apparatus of the present invention includes an antenna to receive the signal, a first demultiplexor for separating the messages in the received signal, a filter unit to filter and group the separated messages into groups of messages having the same bandwidth, combining circuits to combine the messages of each group, an amplifier for each combined group of messages to amplify each combined group of messages, a second demultiplexor to separate each amplified group of messages into separate messages, and a transmitting antenna to transmit the separate messages. The apparatus can be within an earth-orbiting satellite that is a part of a communication system in accordance with the present invention.

BRIEF DESCRIPTION OF THE DRAWINGS

These and other aspects and advantages of the present invention are more apparent from the following detailed description and claims, particularly when considered in conjunction with the accompanying drawings. In the drawings:

DETAILED DESCRIPTION OF PREFERRED EMBODIMENTS

Figure 1:
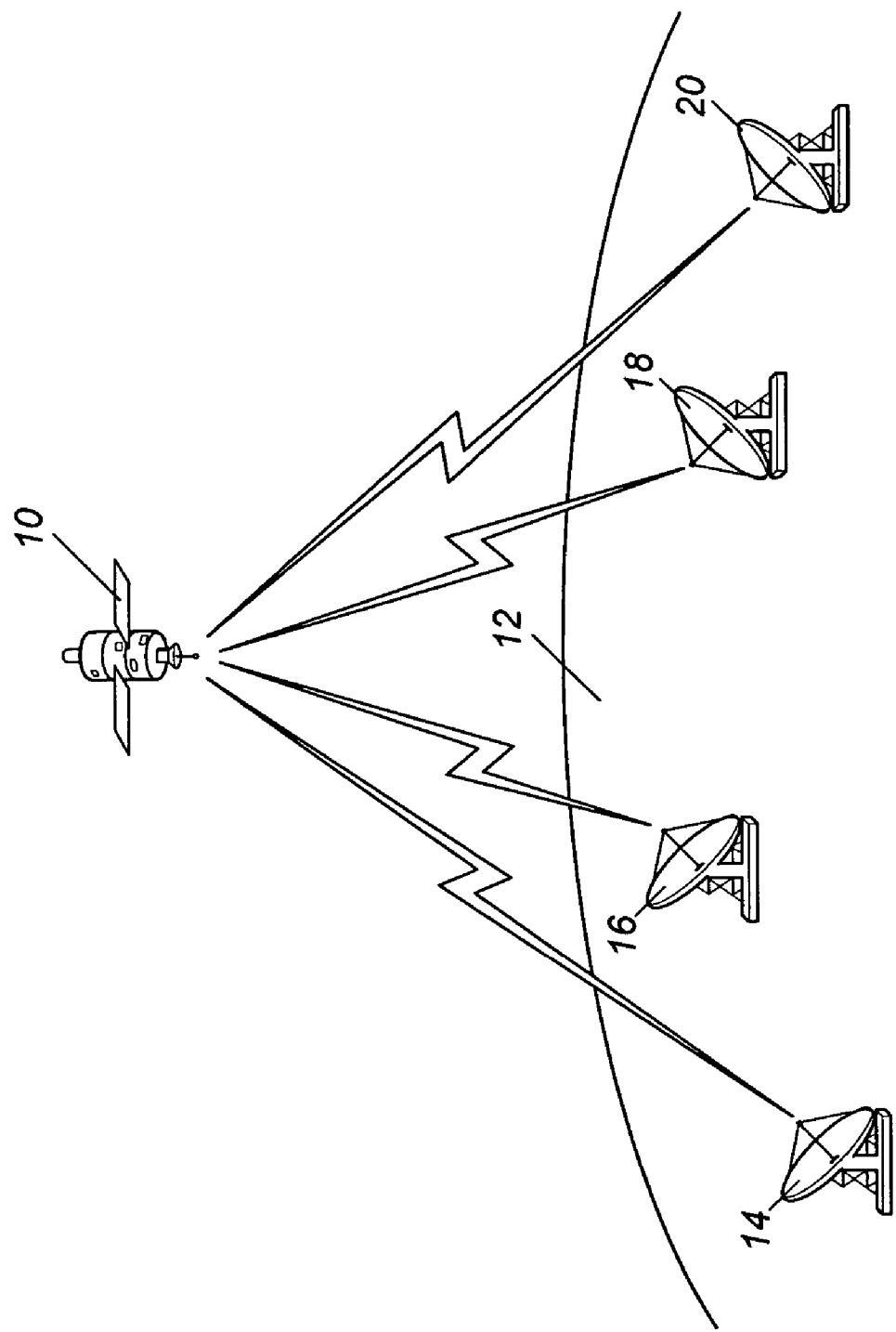
FIG. 1 is a schematic representation of a preferred embodiment of a communication system operating in accordance of the present invention.

FIG. 1 is a schematic representation of a preferred embodiment of a communication system operating in accordance with the present invention. A satellite 10 is operating in an earth orbit above the surface of the earth 12. A plurality of ground stations 14, 16, 18, 20 are capable of communicating through satellite 10. Thus, for example, ground station 14 might transmit a signal including a plurality of messages to satellite 10. Satellite 10 processes these messages and relays separate messages to appropriate ones of the ground stations 16, 18 and 20, as well as to other ground stations. Likewise, ground stations 16, 18, 20 might transmit a signal to satellite 10 with messages that are relayed to other ground stations.

Figures 2, 3:
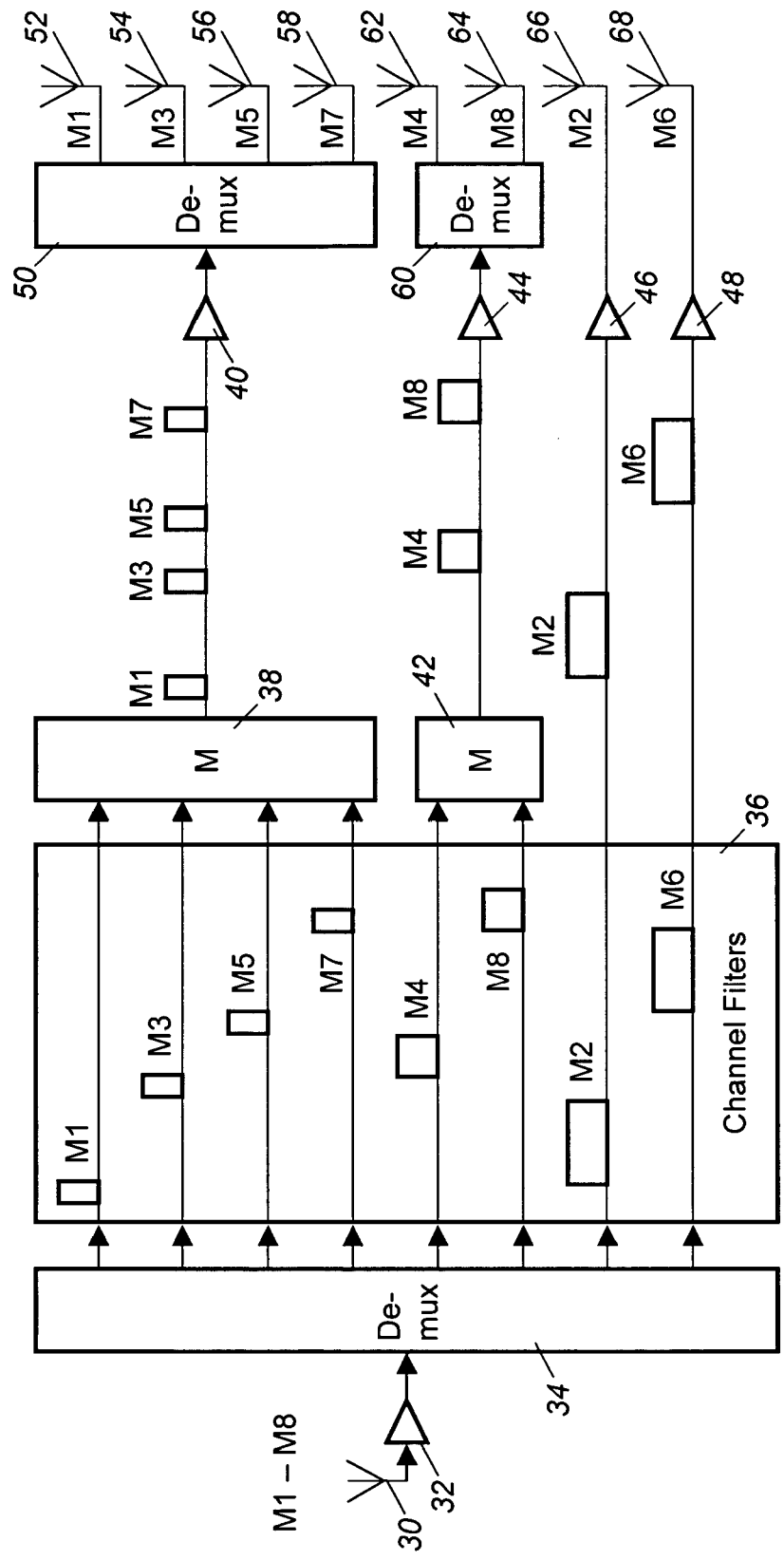
FIG. 2 is an illustration of a typical bandwidth allocation consisting of signals in accordance with a preferred embodiment of the present invention.
FIG. 3 is a block diagram of an apparatus for processing signals in a relaying station in accordance with a preferred embodiment of the present invention.

FIG. 2 illustrates a typical allocation of bandwidth to N separate messages within a signal in accordance with a preferred embodiment of the present invention. Each of the N messages has a unique frequency band with an associated bandwidth, but more than one message way have the same bandwidth. In the illustrative example of FIG. 2, the signal has a total bandwidth 16$b$ and includes eight messages M1-M8. Message M1 is illustrated as having a bandwidth $b$, message M2 a bandwidth 4$b$, message M3 a bandwidth $b$, message M4 a bandwidth 2$b$, message M5 a bandwidth $b$, message M6 a bandwidth 4$b$, message M7 a bandwidth $b$, and message M8 a bandwidth 2$b$. FIG. 2, however, is only one illustration of bandwidth allocation. The total bandwidth B of the signal might be allocated in any manner among N messages, with the bandwidths of the messages occupying the full bandwidth B.

FIG. 3 is a block diagram of an apparatus for processing signals in a relaying station such as satellite 10 in accordance with a preferred embodiment of the present invention. The signals, illustrated in FIG. 3 as the signals M1-M8 of FIG. 2, are received by receiving antenna 30, amplified within an amplifier 32, and applied to a demultiplexor 34. Demultiplexor 34 separates the eight signals and applies them to a set of channel filters 36 which group the signals by bandwidth. Thus, signals M1, M3, M5 and M7, each of which has a bandwidth $b$, are applied by channel filters 36 to a combining circuit 38 which combines these signals of bandwidth $b$ and applies the combined signals to a first traveling wave tube amplifier 40. Similarly, channel filters 36 apply signals M4 and M8, each of which has a bandwidth 2$b$, to a second combining circuit 42 which combines the two signals and applies the combined signals to a second traveling wave tube amplifier 44. Channel filters 36 apply the signal M2 and M6, each of which has a bandwidth 4$b$, directly to respective third and fourth traveling wave tube amplifiers 46 and 48. FIG. 3 illustrates the frequency separation between the signals, depicting the frequency spacing between signals M1, M3, M5 and M7 which are applied to traveling wave tube amplifier 40 and the frequency spacing between signals M4 and M8 which are applied to traveling wave tube amplifier 44. Combining circuits 38 and 42 might be multiplexors or any other suitable circuit for combining the signals applied to them.

The signals M1, M3, M5, and M7 are applied by traveling wave tube amplifier 40 to demultiplexor 50 which applies the M1 signal to a transmitting antenna 52, the M3 signal to a transmitting antenna 54, the M5 signal to a transmitting antenna 56, and the M7 signal to a transmitting antenna 58. Likewise, traveling wave tube 44 applies the M4 and M8 signals to demultiplexor 60 which applies the M4 signal to a transmitting antenna 62 and the M8 signal to a transmitting amplifier 64. Traveling wave tube 46 applies the M2 signal directly to a transmitting antenna 66, while traveling wave tube amplifier 48 applies the M6 signal directly to a transmitting antenna 68. The signals M1-M8 are thus transmitted to respective receiving stations.

Because the messages passing through any one traveling wave tube amplifier are in frequency bands separated by other frequencies, minimal channel passband gain and phase distortion is experienced. The N messages are processed by fewer traveling wave tube amplifiers, significantly reducing the number of traveling wave tube amplifiers required. Messages M2 and M6 in FIGS. 2 and 3 could be combined, amplified in a single traveling wave tube amplifier, and demultiplexed, if desired.

The bandwidth allocation need not necessarily be that depicted in FIG. 2. Other allocations could easily be accommodated, so long as no two messages having adjacent frequency bands have the same bandwidth and are applied to the same traveling wave tube amplifier. The frequency allocation must result in a frequency separation between the signals applied to any one traveling wave tube amplifier, as illustrated in FIG. 3.

Although the present invention has been described with reference to preferred embodiments, various alterations, rearrangements, and substitutions could be made, and still the result would be within the scope of the invention.

What is claimed is:

1. A method of processing a signal with frequencies within a frequency band having a bandwidth B, the signal including a plurality of messages, each message having frequencies within a unique frequency band, where the frequency bands of the plurality of messages occupy the bandwidth B, and where messages with adjacent frequency bands may have different bandwidths, said method comprising:

receiving the signal;

separating the signal into groups of messages having frequency bands with the same bandwidth, all messages in any group occupy non-adjacent frequency bands;

combining the messages of each group;

applying each combined group of messages to a separate amplifier to amplify each combined group of messages; and separating each amplified group of messages into separate messages.

2. A method as claimed in claim 1, further comprising transmitting each separated message to a respective receiving station.

3. A method of communicating a plurality of messages from an originating station, through a relaying station, to a plurality of receiving stations, said method comprising transmitting the plurality of messages from the originating station to the relaying station in a signal with frequencies within a frequency band having a bandwidth B, with each message having frequencies within a unique frequency band, where the frequency bands of the plurality of messages occupy the bandwidth B, and where messages with adjacent frequency bands may have different bandwidths; and at the relaying station:

separating the messages into groups of messages having the same bandwidth, where all messages in any group occupy non-adjacent frequency bands;

combining the messages of each group;

applying each combined group of messages to a separate amplifier to amplify each combined group of messages;

separating each amplified group of messages into separate messages; and transmitting each separated message to a respective receiving station.

4. An article, comprising a storage medium having instructions stored thereon, the storage medium being readable by an apparatus for processing signals, the instructions when executed processing a signal with frequencies within a frequency band having a bandwidth B, the signal including a plurality of messages, each message having frequencies within a unique frequency band, where the frequency bands of the plurality of messages occupy the bandwidth B, and where messages with adjacent frequency bands may have different bandwidths, the instructions processing the signal by receiving the signal; separating the signal into groups of messages having frequency bands with the same bandwidth, where all messages in any group occupy non-adjacent frequency bands; combining the messages of each group; applying each combined group of messages to a separate amplifier to amplify each combined group of messages; and separating each amplified group of messages into separate messages.

5. An article as claimed in claim 4, wherein the instructions when executed further transmit each separated message to a respective receiving station.

6. An article, comprising a storage medium having instructions stored thereon, the storage medium being readable by an apparatus for processing signals, the instructions when executed communicating a plurality of messages from an originating station, through a relaying station, to a plurality of receiving stations, the instructions communicating the messages by transmitting the plurality of messages from the originating station to the relaying station in a signal with frequencies within a frequency band having a bandwidth B, with each message having frequencies within a unique frequency band, where the frequency bands of the plurality of messages occupy the bandwidth B, and where messages with adjacent frequency bands may have different bandwidths; and at the relaying station separating the messages into groups of messages having the same bandwidth, where all messages In any group occupy non-adjacent frequency bands; combining the messages of each group; applying each combined group of messages to a separate amplifier to amplify each combined group of messages; separating each amplified group of messages into separate messages; and transmitting each separated message to a respective receiving station.

7. A apparatus for processing a signal with frequencies within a frequency band having a bandwidth B, the signal including a plurality of messages, each message having frequencies within a unique frequency band, where the frequency bands of the plurality of messages occupy the bandwidth B, and where messages with adjacent frequency bands may have different bandwidths, said apparatus comprising:
an antenna to receive the signal;
a first demultiplexor to separate the messages;
a filter unit to filter and group the separated messages into groups of messages having the same bandwidth, where all messages in a group occupy non-adjacent frequency bands;
a combining circuit to combine the messages of each group;
an amplifier for each group of messages to amplify each combined group of messages; and
a second demultiplexor to separate each amplified group of messages into separate messages.

8. An apparatus as claimed in claim 7, wherein the amplifier comprises a traveling wave tube amplifier.

9. An apparatus as claimed in claim 7, further comprising a transmitting antenna to transmit the separated messages.

10. An apparatus as claimed in claim 7, comprising an earth-orbiting satellite.

11. A communication system, comprising:
an originating station to transmit a signal including a plurality of messages, the signal having frequencies within a frequency band having a bandwidth B, with each message having frequencies within a unique frequency band, where the frequency bands of the plurality of messages occupy the bandwidth B and where messages with adjacent frequency bands may have different bandwidths;
a plurality of receiving stations to receive the plurality of messages; and
a relaying station including an antenna to receive the signal, a first demultiplexor to separate the messages, a filter unit to filter and group the separated messages into groups of messages having the same bandwidth, where all messages in any group occupy non-adjacent frequency bands, a combining circuit to combine the messages of each group, an amplifier for each group of messages to amplify each combined group of messages, a second demultiplexor to separate each amplified group of messages into separate messages, and means for transmitting the separated messages to their respective receiving stations.

12. An apparatus as claimed in claim 11, wherein the amplifier comprises a traveling wave tube amplifier.

13. A communication system as claimed in claim 11, wherein said relaying station comprises an earth-orbiting satellite.

14. An apparatus for processing a signal with frequencies within a frequency band having a bandwidth B, the signal including a plurality of messages, each message having frequencies within a unique frequency band, where the frequency bands of the plurality of messages occupy the bandwidth B, and where messages with adjacent frequency bands may have different bandwidths, comprising:
means for receiving the signal;
means for separating the signal into groups of messages having frequency bands with the same bandwidth, all messages in any group occupy non-adjacent frequency bands;
means for combining the messages of each group;
means for applying each combined group of messages to a separate amplifier to amplify each combined group of messages; and
means for separating each amplified group of messages into separate messages.

15. The apparatus of claim 14, further comprising means for transmitting each separated message to a respective receiving station.

* * * * *